US005757442A

United States Patent [19]

Jeong

[11] Patent Number: 5,757,442

[45] Date of Patent: May 26, 1998

[54] CATHODE RAY TUBE

[75] Inventor: Bong-kwon Jeong, Ulsan, Rep. of Korea

[73] Assignee: Samsung Display Devices Co., Ltd., Kyungki-do, Rep. of Korea

[21] Appl. No.: 623,376

[22] Filed: Mar. 28, 1996

[30] Foreign Application Priority Data

Jun. 23, 1995 [KR] Rep. of Korea ........................ 95-14530

[51] Int. Cl.[6] .............................. H04J 5/65; H01J 31/00; H01J 61/30; H01K 1/42

[52] U.S. Cl. .......................... 348/821; 348/822; 348/823; 348/824; 33/477 R; 220/2.1 R; 220/2.3 A

[58] Field of Search .................................... 348/821, 823, 348/824, 173, 284, 325, 377, 776, 805, 822; 313/477 R, 478, 479; 358/507, 485; 220/2.1 R, 2.3 A

[56] References Cited

U.S. PATENT DOCUMENTS

| | | | |
|---|---|---|---|
| 3,075,870 | 1/1963 | Hedler et al. | 156/295 |
| 3,909,524 | 9/1975 | Ohkoshi et al. | 313/473 |
| 4,031,553 | 6/1977 | Sumiyoshi et al. | 348/824 |
| 4,168,010 | 9/1979 | Dougherty | 220/2.14 |
| 4,563,612 | 1/1986 | Deal et al. | 313/478 |
| 4,626,740 | 12/1986 | Fitzpatrick | 313/478 |
| 4,641,059 | 2/1987 | Sumiyoshi et al. | 313/477 R |
| 4,656,522 | 4/1987 | Piascinski et al. | 313/478 |
| 4,930,015 | 5/1990 | Dougherty et al. | 358/246 |
| 5,072,301 | 12/1991 | Dziedzic | 358/245 |
| 5,080,622 | 1/1992 | Tuin et al. | 358/247 |

FOREIGN PATENT DOCUMENTS

| | | | |
|---|---|---|---|
| 0616355 | 9/1994 | European Pat. Off. | H01J 29/89 |

*Primary Examiner*—Edward L. Coles, Sr.
*Assistant Examiner*—Tia M. Harris
*Attorney, Agent, or Firm*—Leydig, Voit & Mayer, Ltd.

[57] ABSTRACT

A cathode ray tube having an improved safety feature in preparation for the accidental implosion of a high vacuum cathode ray tube is provided. The cathode ray tube comprises a panel, a funnel sealed with the panel, and an implosion preventing band mounted on a sealing portion of the panel and the funnel, further comprising a flexible auxiliary panel which externally covers the panel and whose skirt is adhered to the sealing portion by means of the implosion preventing band. Thus, an external impact is not directly transmitted to the CRT, and the danger due to the implosion of the front of the panel is reduced. Also, the effectiveness of the implosion preventing band can be improved.

4 Claims, 2 Drawing Sheets

CATHODE RAY TUBE

BACKGROUND OF THE INVENTION

The present invention relates to a cathode ray tube, and more particularly, to a cathode ray tube having an improved safety feature in preparation for the accidental implosion of a high vacuum cathode ray tube.

A conventional CRT, as shown in FIG. 1, is constructed by including a panel 14 whose inner surface is coated with a fluorescent film, a funnel 15 sealed with the panel 14, and a neck portion 16 connected to the funnel 15. An electron gun 17 is housed within the neck portion 16. A deflection yoke 18 is installed on the external surface of the funnel 15. Such a CRT is typically made of a glass enclosure having an internal vacuum of about $10^{-7}$ Torr to provide free space for thermions emitted from the electron gun 17. Accordingly, a sealing portion 19 of the panel 14 and funnel 15 or the front side of the panel 14 may be prone to implode due to structural weaknesses.

To prevent this danger, in a conventional art as shown in FIG. 1, an implosion preventing band 11 is installed and fastened along the outer circumference of a portion of the CRT which is subjected to maximum tension. The implosion preventing band 11 is fixed to a case 13 with ears 12 that are screwed on by a set of screws (not shown), provided at the periphery of implosion preventing band 11, whereby the sealing portion 19 of the CRT is strengthened.

However, since the metallic implosion preventing band 11 is coupled to the maximum tension portion in the CRT which is made of glass, sufficient implosion prevention is not achieved. This is because an external impact would be directly transmitted to the CRT from the case 13 to the ears 12 via the implosion preventing band 11. In addition, when the front side of the panel 14 is crushed and generates broken pieces of glass, there are no countermeasures to prevent danger to a viewer.

SUMMARY OF THE INVENTION

It is an object of the present invention to provide a cathode ray tube (CRT) improved to prevent an external impact from being directly transmitted to the CRT, and decrease the danger to a viewer should implosion occur.

To accomplish the above object, there is provided a cathode ray tube comprising a panel, a funnel sealed to the panel, and an implosion preventing band mounted on a sealing portion of the panel and the funnel, further comprising a flexible auxiliary panel which externally covers the panel and whose skirt is adhered to the sealing portion by means of the implosion preventing band.

Preferably, the auxiliary panel is made of transparent plastic. And, it is preferable that a gap of 0.4 mm to 0.6 mm is formed between the auxiliary panel plastic. And the front side of the panel.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
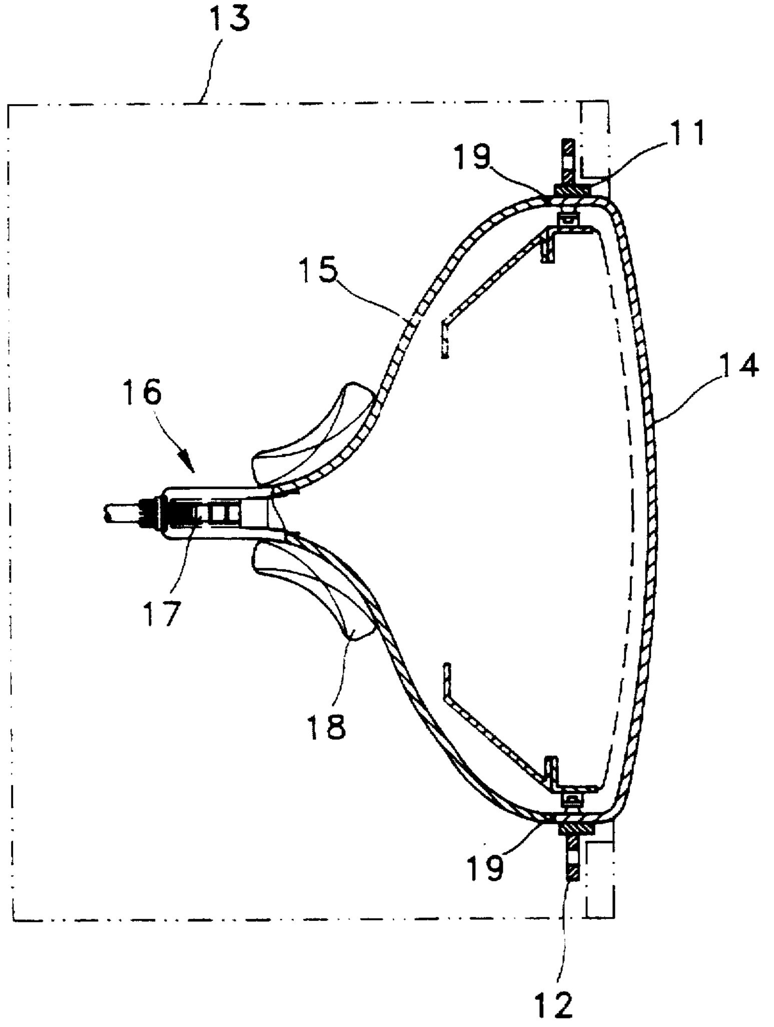
FIG.1(PRIOR ART)
FIG. 1 is a cross-sectional view for showing a conventional cathode ray tube (CRT)
Figure 2:
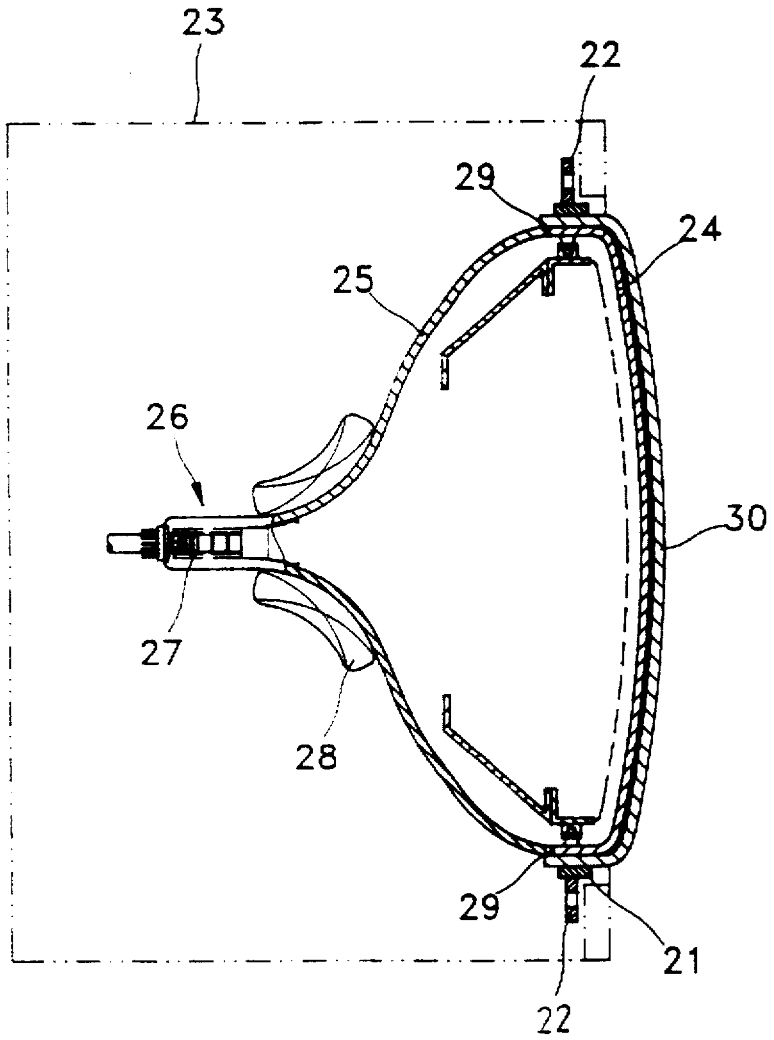
FIG. 2 is a cross-sectional view for showing a CRT according to the present invention.

According to the present invention, a CRT, as shown in FIG. 2, is constructed by including a panel 24 whose inner surface is coated with a fluorescent film, a funnel 25 sealed with the panel 24 and a neck portion 26 connected to the funnel 25. An electron gun 27 is housed within the neck portion 26. A deflection yoke 28 is mounted on the external surface of the funnel 25. This CRT is typically made of glass, and the enclosure is under a high vacuum of about $10^{-7}$ Torr to provide free space for thermions emitted from the electron gun 27.

An auxiliary panel 30 made of transparent and flexible plastic is provided over the outer surface of panel 24 to cover the outer circumference of the panel 24. A gap of about 0.4 mm to 0.6 mm is formed between the front side of the panel 24 and the inner side of the auxiliary panel 30. Here, it is preferable that the gap is about 0.5 mm. The sealing portion 29 of the panel 24 and funnel 25 is covered by the skirt of the auxiliary panel 30. Also, an implosion preventing band 21 is installed along the outer circumference of the skirt of the auxiliary panel 30. Thus, the skirt of the auxiliary panel 30 is stuck to the sealing portion 29 by means of the implosion preventing band 21.

Ears 22 are formed on the corner portions of the implosion preventing band 21. The CRT is tied to a case 23 with the ears 22 that are screwed on.

The auxiliary panel 30 is smoothly adhered to the sealing portion 29 in the CRT via the implosion preventing band 21 and thus absorbs external impacts, to reinforce the sealing portion 29. That is, external impacts are almost entirely absorbed by the auxiliary panel 30, by being transmitted to the CRT in a sequence of the case 23, to the ears 22, to the auxiliary panel 30, to the implosion preventing band 21. Thus, the sealing portion 29 and the CRT can be protected from an external impact.

In addition, even though the front side of the panel 24 may implode, the auxiliary panel 30 made of flexible plastic is not destroyed. Accordingly, broken pieces of the panel 24 generated by the implosion are not spattered toward viewers.

As described above, the CRT according to the present invention can prevent a direct transmission of an external impact to the CRT, by adopting the auxiliary panel made of a flexible substance, thereby reducing the possibility of the implosion of the CRT and improving safety.

The present invention is not limited to the preferred embodiment described in the attached drawings. Those skilled in the art may realize a CRT having a similar form by sufficiently comprehending the preferred embodiment of the present invention. Therefore, the proper scope of technical protection must be set up within the scope of the accompanying claims.

What is claimed is:

1. A cathode ray tube comprising:

a panel;

a funnel sealed to said panel at a sealing portion;

a flexible auxiliary panel including a skirt adhered to the sealing portion on outside surfaces of said funnel and said panel, said auxiliary panel being spaced from a front surface of the cathode ray tube by a gap; and an implosion prevention band mounted on the skirt of said auxiliary panel opposite the sealing portion.

2. The cathode ray tube as claimed in claim 1, wherein said auxiliary panel is a transparent plastic.

3. The cathode ray tube as claimed in claim 1, the gap is about 0.4 mm to 0.6 mm.

4. The cathode ray tube as claimed in claim 3, wherein the gap is about 0.5 mm.

* * * * *